W. J. COOPER.
RAIL FASTENER.
APPLICATION FILED MAY 26, 1911.

1,018,962.

Patented Feb. 27, 1912.

WITNESSES

INVENTOR
William J. Cooper
BY
ATTORNEYS

COLUMBIA PLANOGRAPH CO., WASHINGTON, D. C.

UNITED STATES PATENT OFFICE.

WILLIAM JOHN COOPER, OF RODEO, CALIFORNIA.

RAIL-FASTENER.

1,018,962.  Specification of Letters Patent.  Patented Feb. 27, 1912.

Application filed May 26, 1911. Serial No. 629,606.

*To all whom it may concern:*

Be it known that I, WILLIAM J. COOPER, a citizen of the United States, and a resident of Rodeo, in the county of Contra Costa and State of California, have invented a new and Improved Rail-Fastener, of which the following is a full, clear, and exact description.

My invention relates generally to rail fasteners and more particularly it involves an improved form of spike which is adapted to be driven into position in a tie, the device having one end portion adapted to be positioned without the tie and held securely in relation thereto.

Reference is to be had to the accompanying drawings, forming a part of this specification, in which like characters of reference denote corresponding parts in all the views, and in which—

Figure 1:
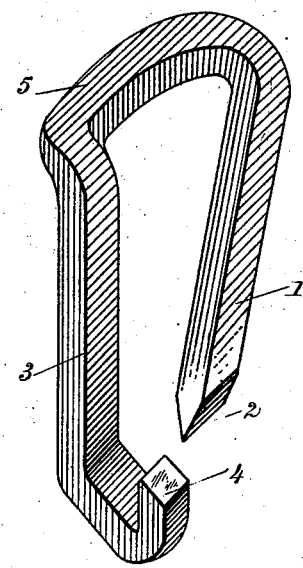
Figure 2:
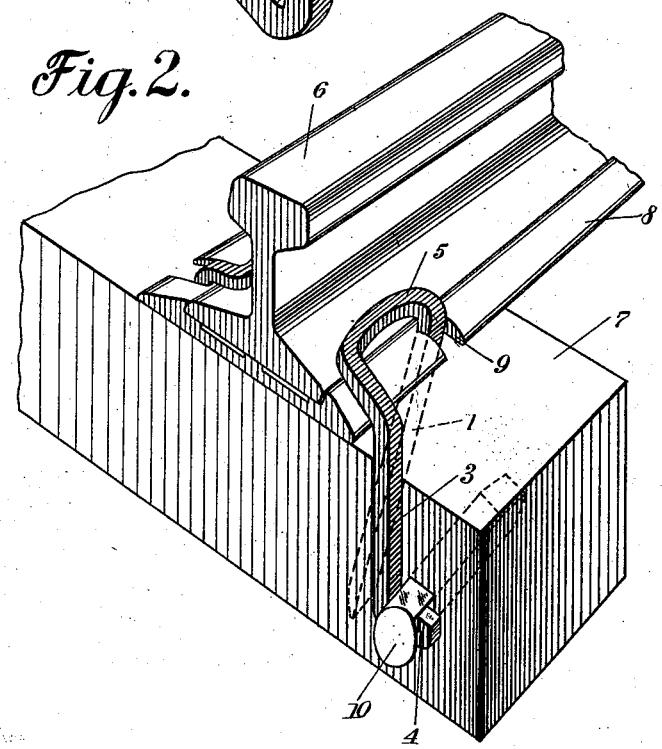

Figure 1 is a perspective view of my improved rail fastener; Fig. 2 is a view, partly sectional, showing the fastener in operative position.

My fastener is preferably made of a single piece of material and bent into the shape shown in Fig. 1, the end portion 1 having a pointed end 2 and the end portion 3 having a hooked end 4; the intermediate portion 5 of the fastener is preferably offset with respect to each of the end portions 1 and 3 whereby when the end portion is held in position this intermediate portion is adapted to engage the base of a rail.

The usual track construction embodying a rail 6, a tie 7, and a fish plate 8, having a recess 9 therein, is shown in Fig. 2; the pointed end portion 1 of the fastener is adapted to be driven into the tie within the recess 9 in the fish plate; this recess is so positioned that with the pointed end within the tie the other end portion 3 will extend downwardly closely adjacent the side of the tie so that when a spike 10 of ordinary construction is driven into the tie transversely thereof and in engagement with a hooked end 4 of a fastener, the intermediate portion 5 thereof will be held in firm engagement with the base of the rail and also with the fish plate.

Such a fastener is of simple construction and may be made at low cost; the rail and plate are held in position by means of the fastener and the fastener in turn is held in position by the spike engaging the tie. The spike may be positioned on the tie by bringing the pointed end portion 1 therein and to a depth sufficient to bring the intermediate portion 5 firmly engaging the base of the rail after which the spike 10 may be driven as shown.

Of course it is obvious that the fastener may be variously formed with respect to the angles thereof and the length of the end portions and the shape of the hoop without departing from the spirit of the invention as defined in the following claims.

Having thus described my invention, I claim as new, and desire to secure by Letters Patent:—

1. A rail fastener made up of a single piece of material and bent at a plurality of points whereby the end portions of the fastener are brought adjacent each other, one end portion being pointed and the other end being hooked, the pointed end being adapted to be driven into a suitable tie and the hooked end being adapted to extend alongside of the tie and be secured in position by a member driven transversely of the tie.

2. A rail fastener made up of a single piece of material and bent at a plurality of points, the end portions thereof being brought adjacent each other, the intermediate portion of the fastener being offset with relation to the end portions, one end portion being pointed, the other end being hooked whereby when the pointed end is driven into a tie the intermediate portion is brought into engagement with a rail, the other end portion of the fastener extending alongside of the tie and secured thereto by any suitable means.

In testimony whereof I have signed my name to this specification in the presence of two subscribing witnesses.

WILLIAM JOHN COOPER.

Witnesses:
  WM. E. LEWIS,
  L. E. CARR.

---

Copies of this patent may be obtained for five cents each, by addressing the "Commissioner of Patents, Washington, D. C."